United States Patent
Tanaka et al.

(10) Patent No.: US 7,471,346 B2
(45) Date of Patent: Dec. 30, 2008

(54) TRANSFLECTIVE LIQUID CRYSTAL DISPLAY PANEL, 2D/3D SWITCHING TYPE LIQUID CRYSTAL DISPLAY PANEL, AND 2D/3D SWITCHING TYPE LIQUID CRYSTAL DISPLAY

(75) Inventors: Toshiyuki Tanaka, Matsusaka (JP); Kanae Suenaga, Osaka (JP); Toshihiro Matsumoto, Nara (JP); Ikuji Konishi, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 10/529,225

(22) PCT Filed: May 28, 2003

(86) PCT No.: PCT/JP03/06713

§ 371 (c)(1),
(2), (4) Date: Mar. 25, 2005

(87) PCT Pub. No.: WO2004/029704

PCT Pub. Date: Apr. 8, 2004

(65) Prior Publication Data

US 2006/0250550 A1    Nov. 9, 2006

(30) Foreign Application Priority Data

Sep. 26, 2002 (JP) ............................. 2002-280627

(51) Int. Cl.
  *G02F 1/1335* (2006.01)
(52) U.S. Cl. ......................................... 349/15; 349/114
(58) Field of Classification Search ................ 349/114, 349/15
See application file for complete search history.

(56) References Cited

U.S. PATENT DOCUMENTS

| 5,493,427 | A | * | 2/1996 | Nomura et al. | ................ | 349/5 |
| 5,875,055 | A | * | 2/1999 | Morishima et al. | .......... | 359/465 |
| 5,969,850 | A | | 10/1999 | Harrold et al. | | |
| 6,046,849 | A | | 4/2000 | Moseley et al. | | |
| 6,055,013 | A | * | 4/2000 | Woodgate et al. | ............. | 348/59 |

(Continued)

FOREIGN PATENT DOCUMENTS

EP    1 109 053 A2    6/2001

(Continued)

OTHER PUBLICATIONS

International Search Report and English translation thereof mailed Aug. 26, 2003 in corresponding JP PCT application No. PCT/JP03/006713.

(Continued)

*Primary Examiner*—James A Dudek
(74) *Attorney, Agent, or Firm*—Nixon & Vanderhye P.C.

(57) ABSTRACT

A transflective type liquid crystal display panel used as a displaying liquid crystal panel in a 2D/3D switching type liquid crystal panel, wherein a color filter having a colored layer and a transparent layer is provided on an opposing substrate. The transparent layer is formed to face only the reflective region of an active matrix substrate (region where a reflective electrode is formed), and serves as a diffuser processed layer. Accordingly, a liquid crystal display panel having a 2D/3D switching function and a transflective function can prevent moire in 2D display and at the same time provide good 3D display.

12 Claims, 7 Drawing Sheets

U.S. PATENT DOCUMENTS

| | | | |
|---|---|---|---|
| 6,195,140 B1 | 2/2001 | Kubo et al. | |
| 6,246,451 B1 * | 6/2001 | Matsumura et al. | 349/15 |
| 6,437,915 B2 * | 8/2002 | Moseley et al. | 359/465 |
| 6,476,889 B2 * | 11/2002 | Urabe et al. | 349/106 |
| 6,522,377 B2 * | 2/2003 | Kim et al. | 349/114 |
| 6,697,135 B1 * | 2/2004 | Baek et al. | 349/106 |
| 6,697,138 B2 * | 2/2004 | Ha et al. | 349/114 |
| 6,710,827 B2 * | 3/2004 | Kubo et al. | 349/55 |
| 6,753,939 B2 * | 6/2004 | Jisaki et al. | 349/114 |
| 6,809,785 B2 * | 10/2004 | Fujino | 349/114 |
| 6,809,791 B2 * | 10/2004 | Yi et al. | 349/160 |
| 6,816,207 B2 * | 11/2004 | Jung | 349/15 |
| 6,885,418 B2 * | 4/2005 | Matsushita et al. | 349/113 |
| 6,977,701 B2 * | 12/2005 | Murai et al. | 349/114 |
| 7,002,642 B2 * | 2/2006 | Jung | 349/15 |
| 2001/0008437 A1 | 7/2001 | Fujimori et al. | |
| 2003/0063244 A1 | 4/2003 | Fujimori et al. | |

FOREIGN PATENT DOCUMENTS

| | | |
|---|---|---|
| EP | 1 248 473 | 10/2002 |
| JP | 8-101367 A | 4/1996 |
| JP | 09-311295 | 12/1997 |
| JP | 11-95167 A | 4/1999 |
| JP | 2001-154181 A | 6/2001 |
| JP | 2002-107750 A | 4/2002 |
| JP | 2002-258014 | 9/2002 |
| JP | 2003-172941 A | 6/2003 |
| JP | 3465695 B2 | 8/2003 |
| JP | 2003-262857 | 9/2003 |

OTHER PUBLICATIONS

International Preliminary Examination Report mailed Jun. 22, 2004 in corresponding PCT Application No. PCT/JP03/006713.
JP 10-142572 corresponds to U.S. 5,969,850 listed above.
JP 2001-211465 corresponds to EP 1 248 473 listed above.

* cited by examiner

■ LIGHT-SHIELDING REGION
☐ LIGHT-TRANSMITTING REGION
▨ RIGHT EYE IMAGE
▨ LEFT EYE IMAGE

US 7,471,346 B2

TRANSFLECTIVE LIQUID CRYSTAL DISPLAY PANEL, 2D/3D SWITCHING TYPE LIQUID CRYSTAL DISPLAY PANEL, AND 2D/3D SWITCHING TYPE LIQUID CRYSTAL DISPLAY

This application is the US national phase of international application PCT/JP03/006713 filed on 28 May 2003, which designated the US and claims priority of JP Application No. 2002-280627 filed 26 Sep. 2002. The entire contents of these applications are incorporated herein by reference.

TECHNICAL FIELD

The present invention relates to a transflective liquid crystal display panel used as a displaying liquid crystal panel in a 2D/3D switching type liquid crystal display panel capable of switching between 2D display and 3D display. The invention also relates to a 2D/3D switching type liquid crystal display panel incorporating the transflective liquid crystal display panel, and to a 2D/3D switching type liquid crystal display.

BACKGROUND ART

In a normal field of vision, the two eyes perceive views of the world from two different perspectives due to their spatial separation within the head. The images from these two perspectives are then recognized as a stereoscopic image by the brain due to parallax of the two images. By utilizing this principle, there has been developed a liquid crystal display in which 3D (three-dimensional) display is carried out by parallax generated by causing an observer to see images from two different points of view through the right eye and the left eye, respectively.

In some 3D liquid crystal displays, images from different points of view are supplied to the respective eyes of the observer by first encoding the left eye image and right eye image on the display screen according to e.g. color, polarization state, or display time, and then separating these images through a filter system of glasses worn by the observer. In this way, only images intended for the respective eyes are supplied to the left eye and right eye of the observer.

In other liquid crystal displays, a display panel 101 is combined with a parallax barrier 101 having a light-transmitting region and a light-shielding region arranged in a stripe pattern. This allows an observer to recognize a 3D image without using a visual assistance such as the filtering system (autostereoscopic display). Specifically, a parallax barrier 102 gives specific viewing angles to the right eye image and left eye image generated by the display panel 101 (see FIG. 8(a)). When viewed in a specific spatial viewing range, only images intended for the respective eyes are viewed by the observer, and a 3D image is recognized (see FIG. 8(b)).

Such a liquid crystal display device that carries out autostereoscopic display by using the parallax barrier is disclosed in U.S. Pat. No. 6,055,013 (Date of patent: Apr. 25, 2000) or Japanese Laid-Open Patent Publication No. 95167/1999 (Tokukaihei 11-95167, publication date: Apr. 9, 1999), for example. In U.S. Pat. No. 6,055,013 (Date of patent: Apr. 25, 2000), a patterned retardation plate is used as the parallax barrier.

Such a liquid crystal display employing a parallax barrier is also disclosed in U.S. Pat. No. 6,046,849 (Date of patent: Apr. 4, 2000), for example. In the liquid crystal display disclosed in this publication, 3D display and 2D display (two-dimensional display) are electrically switched by providing a switching liquid crystal layer or the like as a means of activating and inactivating the effect of the parallax barrier. That is, in accordance with ON/OFF of the switching liquid crystal layer, the display of U.S. Pat. No. 6,046,849 (Date of patent: Apr. 4, 2000) performs 3D display when the effect of the parallax barrier is activated, and performs 2D display when the effect of the parallax barrier is inactivated.

Meanwhile, in these years, a transflective liquid crystal display has been developed, which allows both reflective display and transmissive display on a single display screen. This type of transflective liquid crystal display serves as a reflective display when used in bright surroundings, so that desirable display can be carried out using ambient light without consuming much power. In dark surroundings, the liquid crystal display serves a transmissive display, so that desirable display can be carried out using the backlight.

Conventional transflective liquid crystal displays commonly adapt a system as disclosed in U.S. Pat. No. 6,195,140 (Date of patent: Feb. 27, 2001). The liquid crystal display (disclosed in U.S. Pat. No. 6,195,140 (Date of patent: Feb. 27, 2001) has a structure in which, as shown in FIG. 9, pixel electrodes are disposed in a matrix through switching elements (not shown) at respective intersections of gate bus lines 111 and source bus lines 112 that are mutually orthogonal.

The pixel electrodes include a transparent electrode and reflective electrode which are electrically connected to each other. The transparent electrode is formed on a transparent insulating layer (not shown) formed on the gate bus lines 111, the source bus lines 112, and switching elements. The reflective electrode has an aperture for light transmission, and is formed on the transparent electrode. In the liquid crystal display, reflective display is carried out in a region 113 where the reflective electrode is formed (that is, a reflective region: shaded region in the figure), and transmissive display is carried out through a transmissive region (projected region in the figure) 114, i.e., the aperture formed through the reflective electrode.

In the liquid crystal display carrying out reflective display, microscopic irregularities are formed to prevent an image from reflecting on the reflective electrode. The irregularities formed on the reflective electrode should be randomly disposed. However, for simplicity of the process, the irregularities are formed by a recurrent pattern. When the recurrent pattern of the irregularities is periodic, the reflecting light at the reflective electrode generates a periodic interference pattern, called moire, which deteriorates image quality.

In order to solve moire, in liquid crystal displays carrying out reflective display, normally, a diffuser process is carried out. In the diffuser process, fine particles are added to an adhesive layer which is used to attach a polarizer to the display surface side of a liquid crystal display panel, so that moire can be prevented by the light scattering effect of the fine particles.

However, in the conventional arrangement, the following problem occurs when the 2D/3D switching display function and the transflective function are used in combination in the same liquid crystal display panel.

As described with reference to FIG. 8 above, 3D display utilizes linearity of light emitted from the backlight and transmitted through the liquid crystal display panel. Therefore, in 3D display, only the transmissive region of each pixel is used, and the reflective region is not used at all. Also, when 2D display is performed, since the diffusing process for preventing moire is performed over the entire liquid crystal display panel, its effect also covers the transmissive region.

However, since the diffuser process gives the scattering effect to the light that emerges from the display surface side of the liquid crystal display panel, the display performance of 3D display utilizing linearity of light deteriorates significantly when the scattering effect is given to the outgoing light from the transmissive region of the liquid crystal display panel.

In other words, when the 2D/3D switching function and the transflective function are used in combination in the same liquid crystal display panel, desirable 3D display cannot be obtained while at the same time preventing moire in 2D display.

DISCLOSURE OF INVENTION

The present invention was made to solve the foregoing problem. An object of the present invention is to provide a liquid crystal display panel including a 2D/3D switching function and a transflective function, in which desirable 3D display can be obtained while at the same time preventing moire in 2D display.

To attain the foregoing object, a transflective liquid crystal display panel of the present invention includes a reflective region for performing reflective display; and a transmissive region for performing transmissive display, the reflective region and the transmissive region being provided for each pixel, and a diffuser process being performed only in a portion corresponding to the reflective region.

The diffuser process utilizes the scattering effect of light to prevent moire, which is generated by microscopic irregular patterns formed on a surface of a reflective electrode. In other words, in a transmissive region where moire does not occur, there is no problem in performing display even if the scattering effect due to the diffuser process cannot be obtained.

On the other hand, when the transflective liquid crystal display panel is used as display image generating means in a 2D/3D switching type liquid crystal display panel, the transmissive region is used for performing both 2D display and 3D display. In 3D display, parallax is given to a right eye image and left eye image by utilizing linearity of light. Thus, scattering the display light in the transmissive region significantly deteriorates the performance of 3D display.

On the contrary, according to the foregoing arrangement, the diffuser process is carried out only in a portion corresponding to the reflective region. As a result, the light scattering effect by the diffuser process does not occur in the transmissive region. Thus, the linearity of display light is not hindered and desirable 3D display performance is attained. As a result, desirable 3D display can be realized while at the same time preventing moire in 2D display.

It is preferable that the transflective liquid crystal display panel further includes a color filter having a colored layer formed in a portion corresponding to both the transmissive region and the reflective region; and a transparent layer formed only in a portion corresponding to the reflective region, wherein the diffuser process is performed only in the portion corresponding to the reflective region, by using at least part of the transparent layer as a diffuser processed layer.

In the transflective liquid crystal display panel, ambient light, which is used as display light for the reflective region, is transmitted through the color filter or the liquid crystal layer twice. On the other hand, incident light from a backlight, which is used as display light for the transmissive region, is transmitted through the color filter or the liquid crystal layer only once. Therefore, if the color filter and the liquid crystal layer have the same arrangement in the reflective region and the transmissive region, the optical density of the color filter or the optical function of the liquid crystal layer become different between the reflective region and the transmissive region.

On the contrary, according to the foregoing arrangement, the color filter includes the colored layer and the transparent layer. With the transparent layer formed in a portion corresponding to the reflective region, the optical density of the color filter or the optical function of the liquid crystal layer will not be too different between the reflective region and the transmissive region.

Furthermore, by using the transparent layer to also serve as a diffuser processed layer (a layer in which fine particles have been added to impart light scattering effect to the base material such as a resin), the diffuser process can be performed only in a portion corresponding to the reflective region, without requiring an additional diffuser process, that is, an additional step of forming the diffuser processed layer.

It is preferable in the transflective liquid crystal display panel that the color filter has an aperture through the colored layer in the reflective region, and a transparent layer is formed in the aperture.

According to this arrangement, the colored layer in the reflective region has an aperture, and the transparent layer is formed in the aperture. Therefore, the light transmitted through the aperture is not absorbed by the colored layer, and the optical density of the color filter in the reflective region can be reduced.

In other words, when the arrangement of the color filter is the same for the reflective region and the transmissive region, the optical density of the color filter is greater in the reflective region than in the transmissive region because the light travels through this region of the color filter more often. However, as described above, by reducing the optical density of the color filter in the reflective region, the optical density of the color filter will not be too different between the reflective region and the transmissive region.

It is preferable in the transflective liquid crystal display panel that a thickness of the colored layer in the color filter is thinner in the reflective region than in the transmissive region.

According to this arrangement, the thickness of the colored layer is thinner in the reflective region than in the transmissive region. Therefore, the absorptivity for each passage of light transmitting through the colored layer in the reflective region can be reduced. As a result, the optical density of the color filter in the reflective region can be reduced. Thus, the optical density of the color filter will not be too different between the reflective region and the transmissive region.

In the transflective liquid crystal display, it is preferable that a thickness of the colored layer in the transmissive region is twice as thick as that in the reflective region.

According to this arrangement, substantially the same absorptivity can be obtained for the light transmitting through the color filter in the reflective region twice and the light transmitting through the color filter in the transmissive region once. As a result, the same optical density can be obtained in the transmissive region and the reflective region.

It is preferable in the transflective liquid crystal display panel that the color filter has a step difference between a portion corresponding to the reflective region and a portion corresponding to the transmissive region, and the step difference causes a thickness of the liquid crystal layer in the reflective region to be thinner than that in the transmissive region.

According to the arrangement, the formation of the transparent layer creates a surface step difference between a portion corresponding to the reflective region and a portion corresponding to the transmissive region. With the surface step difference, the thickness of the liquid crystal layer in the reflective region is set to be smaller than that in the transmissive region.

When the thicknesses of the liquid crystal layer is the same in the reflective region and the transmissive region, the light path of light passing through the liquid crystal layer is longer in the reflective region than in the transmissive region, and the optical function of the liquid crystal layer is greater for this light. On the contrary, when the thickness of the liquid crystal layer is thinner in the reflective region than in the transmissive region, the light path length and therefore the optical function of the liquid crystal layer will not be too different between the reflective region and the transmissive region.

Further, it is preferable that the transflective liquid crystal display includes transparent electrode formed in the portion corresponding to the transmissive region; and a reflective electrode formed in the portion corresponding to the reflective region, wherein a step difference is created between the transparent electrode and the reflective electrode, and the step-difference sets a thickness ratio of the liquid crystal layer between the reflective region and the transmissive region.

According to this arrangement, with the surface step difference in the color filter, and with the surface step difference between the transmissive electrode and the reflective electrode, a thickness ratio of the liquid crystal layer can be suitably set between the reflective region and the transmissive region.

It is preferable in the transflective liquid crystal display panel that a thickness of the liquid crystal layer in the transmissive region is twice as thick as that in the reflective region.

According to this arrangement, the light path length will not be different between the reflective region and the transmissive region, so that the same optical function can be obtained in the liquid crystal layer.

To attain the foregoing object, a 2D/3D switching type liquid crystal display panel includes display image generating means, capable of carrying out 2D display and 3D display, for generating a display image according to input image data; parallax barrier means for giving a specific viewing angle to the display image in carrying out 3D display, so as to obtain a 3D effect; and switching means for activating and inactivating the effect of the parallax barrier means, so as to switch 2D display and 3D display, the display image generating means being a transflective liquid crystal display panel.

To attain the foregoing object, a 2D/3D switching type liquid crystal display of the present invention incorporates the 2D/3D switching type liquid crystal display panel.

In accordance with the arrangement of the 2D/3D switching type liquid crystal display panel and the 2D/3D switching type liquid crystal display, desirable 3D display can be obtained while at the same time preventing moire in 2D display, as in the transflective liquid crystal display panel.

For a fuller understanding of the nature and advantages of the invention, reference should be made to the ensuing detailed description taken in conjunction with the accompanying drawings.

BEST MODE FOR CARRYING OUT THE INVENTION

The following will describe the present invention in more detail by way of examples and comparative examples. It should be noted, however, that the invention is not limited in any way by the following.

With reference to FIGS. 1 through 7, one embodiment of the present invention is described below.

Figure 2:
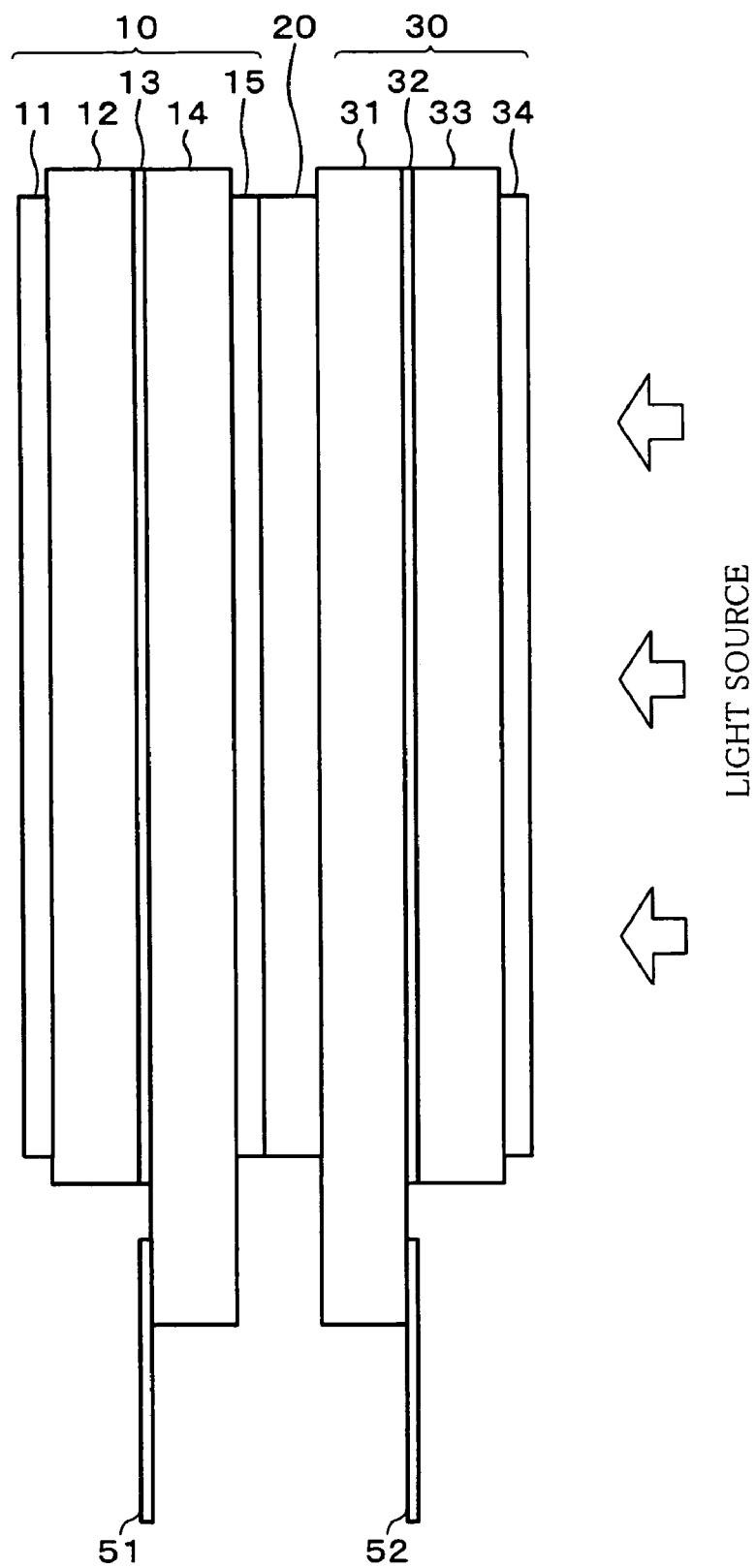
FIG. 2 is a cross-sectional view illustrating a schematic structure of a 2D/3D switching type liquid crystal display panel using the transflective liquid crystal display panel as a displaying liquid crystal panel.

First, FIG. 2 illustrates a schematic arrangement of a 2D/3D switching type liquid crystal display panel of the present embodiment. As shown in FIG. 2, for the 2D/3D switching function, the 2D/3D switching type liquid crystal display includes a displaying liquid crystal panel 10, a patterned retardation plate 20, and a switching liquid crystal panel 30, which are bonded together.

The displaying liquid crystal panel 10 is provided as a TFT liquid crystal display panel, and includes stacked layers of a first polarizer 11, an opposing substrate 12, a liquid crystal layer 13, an active matrix substrate 14, and a second polarizer 15. Through wiring 51 such as flexible printed circuits (FPC), the active matrix substrate 14 receives image data corresponding to an image to be displayed.

That is, the displaying liquid crystal panel 10 is provided as display image generating means for generating a display image corresponding to image data. Details of the displaying liquid crystal panel 10, which is also provided as a transflective liquid crystal display panel, are described later. As long as the displaying liquid crystal panel 10 has a function of generating a display image, a display method (TN method or STN method) and a driving method (active matrix driving or passive matrix driving) for the displaying liquid crystal panel 10 are not particularly limited.

Figure 3A:
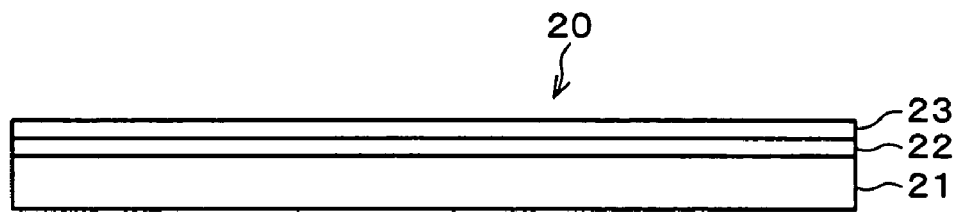
FIG. 3(a) is a cross-sectional view of the patterned retardation plate used in the 2D/3D switching type liquid crystal display panel.
Figure 3B:
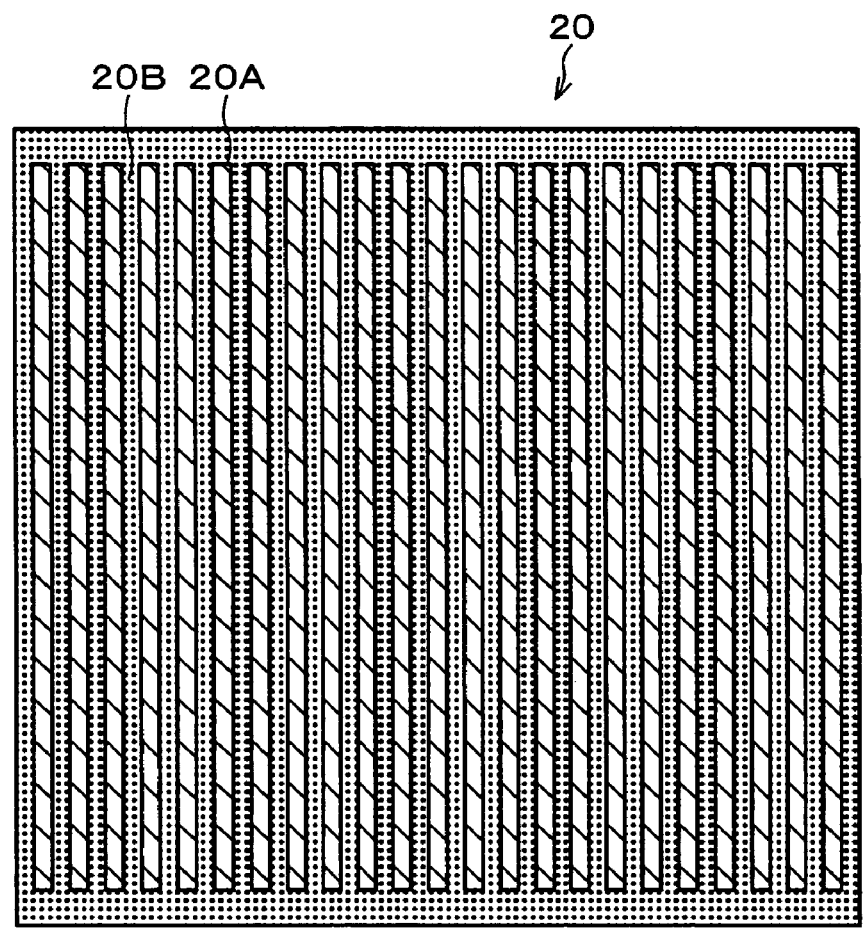
FIG. 3(b) is a plan view of the patterned retardation plate used in the 2D/3D switching type liquid crystal display panel.

The patterned retardation plate 20 functions as a part of a parallax barrier. As shown in FIG. 3(a), the patterned retardation plate 20 has stacked layers of a transparent substrate 21, an alignment film 22, and a liquid crystal layer 23 formed in this order. In an active area of the patterned retardation plate 20, as shown in FIG. 3(b), a first region 20A (shaded region in the figure) and a second region 20B (projected region in the figure) having different polarization states are arranged alternately in stripes.

The switching liquid crystal panel 30 has stacked layers of a driver-side substrate 31, a liquid crystal layer 32, an opposing substrate 33, and a third polarizer 34. The driver-side substrate 31 is connected to wiring 52. Through the wiring 52, a driving voltage is applied to the driver-side substrate 31 when the liquid crystal layer 32 is ON.

The switching liquid crystal panel 30 is provided as switching means for switching a polarization state of light (light transmitted through the switching liquid crystal panel 30) in accordance with ON/OFF of the liquid crystal layer 32. Specifically, the switching liquid crystal panel 30 optically modulates the light (light transmitted through the switching liquid crystal panel 30) differently in performing 2D display and 3D display. Unlike the displaying liquid crystal panel 10, the switching liquid crystal panel 30 does not need to be driven by matrix driving. Driving electrodes for the driver-side substrate 31 and the opposing substrate 33 are formed over an entire surface of an active area of the switching liquid crystal panel 30.

As to the 2D/3D switching function, described next is a display operation of the 2D/3D switching type liquid crystal display panel arranged in the foregoing manner.

Figure 4:
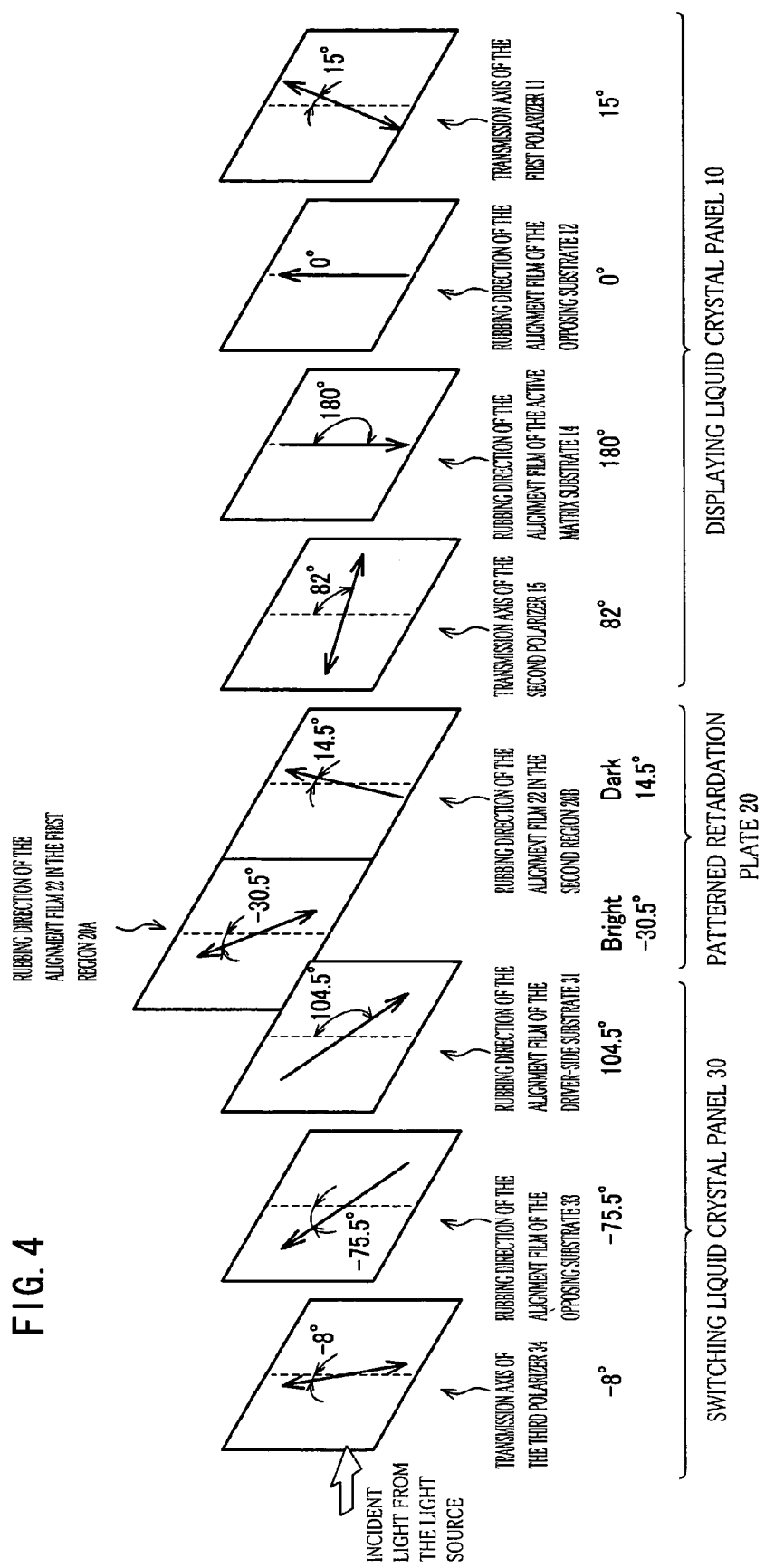
FIG. 4 is a diagram illustrating an optical axis direction in each member of the 2D/3D switching type liquid crystal display panel.

To begin with, FIG. 4 illustrates an optical axis direction of each member of the 2D/3D switching type liquid crystal display panel shown in FIG. 2. In the liquid crystal panels and retardation plates, the optical axes shown in FIG. 4 are directed in the direction of a slow phase axis of the alignment film (i.e. a rubbing direction of the alignment film). In the polarizers, the optical axes are directed in the direction of a transmission axis.

In the arrangement of FIG. 4, incident light from a light source is firstly polarized by the third polarizer 34 of the switching liquid crystal panel 30. When 3D display is performed, the switching liquid crystal display panel 30 is OFF, and functions as a half wave plate.

The light transmitted through the switching liquid crystal panel 30 is then incident on the patterned retardation plate 20. In the first region 20A and the second region 20B of the patterned retardation plate 20, rubbing directions (i.e. directions of slow axes) are different. Therefore, light transmitted through the first region 20A and light transmitted through the second region 20B are polarized differently. In FIG. 4, the polarization axis of the light transmitted through the first region 20A and the polarization axis of the light transmitted through the second region 20B are different by 90°. With the birefringence anisotropy and thickness of the liquid crystal layer 23, the patterned retardation plate 20 is set to serve as a half wave plate.

The light transmitted through the patterned retardation plate 20 is incident on the second polarizer 15 of the displaying liquid crystal panel 10. When 3D display is performed, the polarization axis of the light transmitted through the first region 20A of the patterned retardation plate 20 is parallel to the transmission axis of the second polarizer 15. Therefore, the light transmitted through the first region 20A is transmitted through the polarizer 15. On the other hand, the polarization axis of the light transmitted through the second region 20B forms an angle of 90° with the transmission axis of the second polarizer 15. Therefore, the light transmitted through the second region 20B is not transmitted through the polarizer 15.

According to the arrangement in FIG. 4, the function of parallax barrier (parallax barrier means) is attained by optical interaction between the patterned retardation plate 20 and the second polarizer 15. According to this arrangement, the first region 20A of the patterned retardation plate 20 serves as a transmissive region, and the second region 20B of the patterned retardation plate 20 serves as a cutoff region.

The light transmitted through the second polarizer 15 is subjected to optical modulation in the liquid crystal layer 13 of the displaying liquid crystal panel 10. Here, the optical modulation is different for the pixels undergoing black display and the pixels undergoing white display. Only the optically modulated light of the pixels undergoing white display is transmitted through the first polarizer 11, thereby displaying an image.

Here, for 3D display, the light transmitted through the transmissive region of the parallax barrier and modified to have a specific viewing angle is transmitted through the displaying liquid crystal panel 10 in such a manner that the light passes through pixels corresponding to an image for the right eye and pixels corresponding to an image for the left eye. As a result, the right eye image and left eye image are separated to have different viewing angles, and 3D display is carried out.

In order to perform 2D display, the switching liquid crystal panel 30 is turned ON, so that the light transmitted through the switching liquid crystal panel 30 will not be optically modulated. The light transmitted through the switching liquid crystal panel 30 is then transmitted through the patterned retardation plate 20 in such a manner that the light transmitted through the first region 20A and the light transmitted through the second region 20B have different polarization states.

However, unlike 3D display, the switching liquid crystal display panel 30 does not perform optical modulation in 2D display. Therefore, the polarization axes of light beams transmitted through the patterned retardation plate 20 will be symmetrical with respect to the transmission axis of the second polarizer 15. As a result, the light transmitted through the first region 20A of the patterned retardation plate 20 and the light transmitted through the second region 20B of the patterned retardation plate 20 are transmitted through the second polarizer 15 at the same transmittance. Thus, the function of parallax barrier due to optical interaction between the patterned retardation plate 20 and the second polarizer 15 is not attained (that is, no specific viewing angle is given), with the result that 2D display is carried out.

Next, a specific structure of the 2D/3D switching type liquid crystal display panel 10 is described with reference to FIG. 1. As noted above, the displaying liquid crystal panel 10 is a transflective liquid crystal display panel used as a displaying liquid crystal panel in the 2D/3D switching type liquid crystal display panel which enables switching between 2D display and 3D display. Note that, FIG. 1 shows a cross sectional structure for one pixel.

Figure 1:
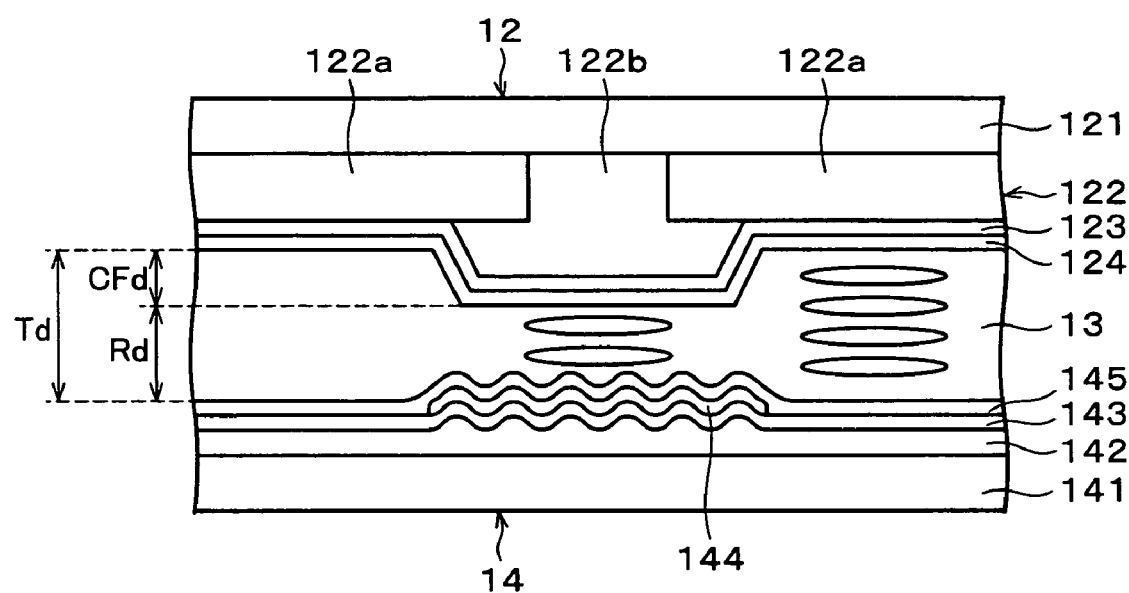
FIG. 1 is a cross-sectional view illustrating a schematic structure of a transflective liquid crystal display panel according to one embodiment of the present invention.

The displaying liquid crystal panel 10, as shown in FIG. 1, includes a pair of opposing substrates (the front and the back) (that is, the opposing substrate 12 and the active matrix substrate 14 shown in FIG. 2), and the liquid crystal layer 13, provided as an electro-optic layer, which is interposed between the opposing substrate 12 and the active matrix substrate 14. In FIG. 1, the first polarizer 11 and the second polarizer 15 illustrated in FIG. 2 are omitted. In the displaying liquid crystal panel 10, one or more retardation plates may be inserted between the polarizer 15 and the active matrix substrate 14 and between the first polarizer 11 and the opposing substrate 12, so as to provide optical compensation together with the refractive index anisotropy of the liquid crystal layer 13. Inserting a retardation plate only between the first polarizer 11 and the opposing plate 12 can also provide optical compensation.

First, a specific structure of the active matrix substrate 14 is described. The active matrix substrate 14 includes a transparent substrate 141, a transparent insulating layer 142, a transparent electrode 143, a reflective electrode 144, and an alignment film 145, which are stacked in this order from the light incident side of the displaying liquid crystal panel 10 (light source side).

Scanning bus lines, data bus lines, and switching elements for driving the transmissive electrode 143 and the reflective electrode 144 are actually formed beneath the transparent insulating layer 142, though they are omitted in FIG. 1. The transmissive electrode 143 and the reflective electrode 144 are electrically connected to drains of the switching elements through contact holes provided through the transparent insulating layer 142. With the switching elements provided beneath the reflective electrode, an aperture ratio can be improved.

According to the example of FIG. 1, pixel electrodes provided on the active matrix substrate 14 side are realized by the transmissive electrode 143 made of Indium Tin Oxide (ITO) etc., and the reflective electrode 144 formed of a metal film. The transmissive electrode 143 is formed over all the pixels, while the reflective electrode 144 is formed in a portion of the pixel region over the transparent electrode 143.

Thus, each pixel is divided into a region where the reflective electrode 144 is formed, and a region where the reflective electrode 144 is not formed. The region where the reflective electrode 144 is formed serves as a reflective region, while the region where the reflective electrode 144 is not formed serves as a transmissive region. Also, the reflective electrode 144 needs to have microscopic irregularities on its surface in order to prevent an image from reflecting. To this end, in the transparent insulating layer 142, a region corresponding to the region where the reflective electrode 144 is formed has irregularities on its surface, and the reflective electrode 144 is formed above the irregular surface of the transparent insulating layer 142. The alignment film 145 is deposited on the pixel electrodes realized by the transmissive electrode 143 and the reflective electrode 144.

In this manner, in the displaying liquid crystal panel 10 of the present embodiment, the pixel electrodes formed on the active matrix substrate 14 has a hybrid structure including the transmissive electrode 143 and the reflective electrode 144. In the example of FIG. 1, the reflective electrode 144 is formed above the irregular surface of the transparent insulating layer 142, and on the transmissive electrode 143 (electrically connected). However, it is not necessarily required to provide the transmissive electrode 143 beneath the reflective electrode 144. For example, The transmissive electrode 143 and the reflective electrode 144 may be electrically connected to each other in portions where the edges (boarders) of the respective electrodes overlap.

Described next is a specific structure of the opposing substrate 12. The opposing substrate 12 includes a transparent substrate 121, a color filter 122, an opposing electrode 123, and an alignment film 124, which are stacked in this order from the light outgoing side (display side) of the displaying liquid crystal panel 10.

In the displaying liquid crystal panel 10, pixels are formed in a portion where the opposing electrode 123 of the opposing substrate 12 and the pixel electrode of the active matrix substrate 14 face each other. A color filter 122 is formed on the opposing substrate 12 in conformity with the pixels.

In the structure of FIG. 1, the color filter 122 has a stacked structure of a colored layer 122a and a transparent layer 122b. The colored layer 122a has an aperture in a part of the reflective region, and the transparent layer 122b is formed over the aperture. Also, the transparent layer 122b is formed to face only the reflective electrode 144 of the active matrix substrate 14 (in other words, the transparent layer 122b is formed only in the reflective region), so that a step difference is formed between the transmissive region and the reflective region.

The alignment film 145 of the active matrix substrate 14 and the alignment film 124 of the opposing substrate 12 horizontally align the liquid crystal layer 13, which is interposed in between, for example. Also, for the liquid crystal layer 13, liquid crystal of an Electrically Controlled Birefringence (ECB) mode is used in which incident light is transmitted and blocked by employing the birefringence of the liquid crystal.

In the displaying liquid crystal panel 10, the diffuser process is performed only on the transparent layer 122b of the color filter 122. That is, the resin (for example, acrylic resin) making up the transparent layer 122b is mixed with fine particles (silica, or acrylic resin of, for example, a spherical shape having a different reflectivive index from the acrylic resin of the transparent layer 122b), so as to scatter the light transmitting through the transparent layer 122b. In addition, since the transparent layer 122b is formed facing only the reflective electrode 144, the effect of the diffuser process works only on the reflective region.

The diffuser process takes advantage of the light scattering effect to prevent moire due to the reflecting light generated by the microscopic irregularities formed on the surface of the reflective electrode 144. In other words, in the transmissive region where moire does not occur, display can be carried out without causing any problem even when the scattering effect due to the diffuser processes is not be obtained.

In the case where the transflective displaying liquid crystal panel 10 described above is used for the 2D/3D switching type liquid crystal display panel, the transmissive region is used for performing both 2D display and 3D display. In 3D display, linearity of light is utilized, and therefore display performance severely deteriorates when the display light is scattered. In the displaying liquid crystal panel 10, however, the scattering effect due to the diffuser process does not occur in the transmissive region. Therefore, linearity of display light is ensured, and desirable 3D display performance can be realized.

As described above, in the displaying liquid crystal panel 10 of the present embodiment, the layer subjected to the diffuser process (hereafter referred to as "diffuser processed layer") is in the color filter. However, the present invention is not limited to this. That is, in the 2D/3D switching type liquid crystal panel of the present invention, the diffuser process is required to exhibit its effect only in the reflective region of the transflective liquid crystal display panel used as the displaying liquid crystal panel. For example, a diffuser processed layer corresponding to only the reflective region may be formed as a separate filter from the color filter.

However, forming the diffuser processed layer in the color filter is advantageous because it does not require an additional step of forming the diffuser processed layer, and enables the color filter to be formed with the colored layer and the transparent layer. For these advantages, forming the diffuser processed layer in the color filter is highly preferable. Details of the advantages of forming the diffuser processed layer in the color filter are described below.

In the color filter 122 shown in FIG. 1, the colored layer 122a (e.g. acrylic pigment-dispersed photosensitive resin) has the aperture in the reflective region, and the transparent layer 122b is formed above the aperture. Optimizing the area and geometry of the aperture allows an optical density of the colored layer 122b to be controlled between the transmissive region and the reflective region.

In other words, in the transflective liquid crystal display panel, a desired color is reproduced as follows. In the transmissive region, this is achieved when the incident light from the backlight is transmitted through the color filter once. On the contrary, in the reflective region, a desired color is reproduced when ambient incident light on the display surface is transmitted through the color filter twice (back and forth).

Assume that a colored layer of a uniform thickness is provided in the transmissive region and the reflective region without forming an aperture. In this case, the ambient light (used as display light) is transmitted through the color filter twice in the reflective region. Therefore, the absorptivity of the color filter becomes greater for the reflective region than for the transmissive region, with the result that color reproducibility deteriorates.

On the other hand, when the color filter shown in FIG. 1 is used, the provision of the aperture in the colored layer 122a in the reflective region prevents excess absorption of ambient light even when the ambient light is transmitted through the color filter 122 twice. As a result, high reflectivity can be maintained, and the brightness of display can be maintained at a practical level.

In this manner, in the color filter 122, providing the aperture in the colored layer 122 allows reflectivity, color purity, and brightness in the reflective mode to be freely adjusted without degrading color purity in the transmissive mode. In addition, an optimum optical density can be set for each of the transmissive region and the reflective region. To give a specific example, when the area of the aperture of the colored layer 122a in the reflective region is about one-eighth of the area of the reflective region, substantially the same absorptivity can be obtained for the light transmitted through the color filter 122 in the reflective region twice and the light transmitted through the color filter 122 in the transmissive region once (the same optical density can be obtained for the transmissive region and the reflective region).

Figure 5:
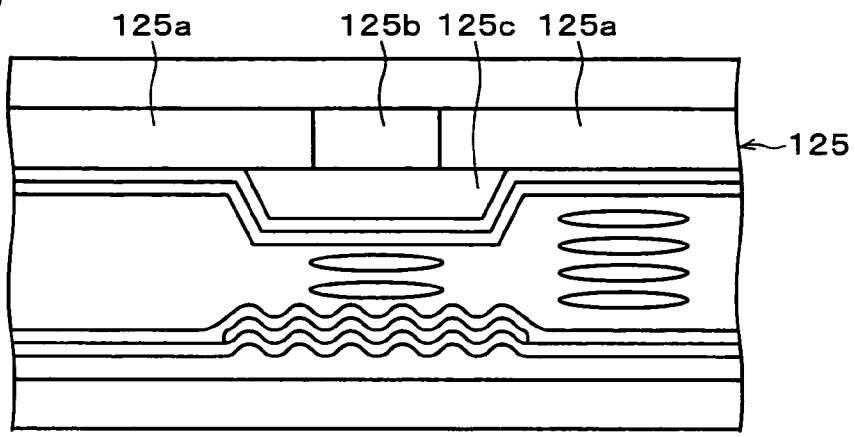
FIG. 5 is a cross-sectional view illustrating a modification example of the reflective tranmissive liquid crystal display panel of the present invention.

Note that, in the structure of FIG. 1, only a single transparent layer, the transparent layer 122b, is provided corresponding to the reflective region. However, the transparent layer may have a bilayer structure as shown in FIG. 5. The exemplary structure shown in FIG. 5 is the same as that illustrated in FIG. 1 except that a color filter 125 is used instead of the color filter 122.

In the color filter 125 illustrated in FIG. 5, the colored layer 125a has the same structure as the colored layer 122a in the color filter 122 shown in FIG. 1. However, the transparent layer corresponding to the reflective region has a bilayer structure including transparent layers 125b and 125c. The transparent layer 125b corresponds to an aperture of the colored layer 125a, and forms a flat surface with the colored layer 125a. Also, the transparent layer 125c is disposed on surfaces of the colored layer 125a and the transparent layer 125b, corresponding to the entire area of the reflective region. In the structure of FIG. 5, only the transparent layer 125c can be used as a diffuser processed layer. In this case, the effect of the diffuser process can be exhibited evenly over the entire reflective region.

Figure 6:
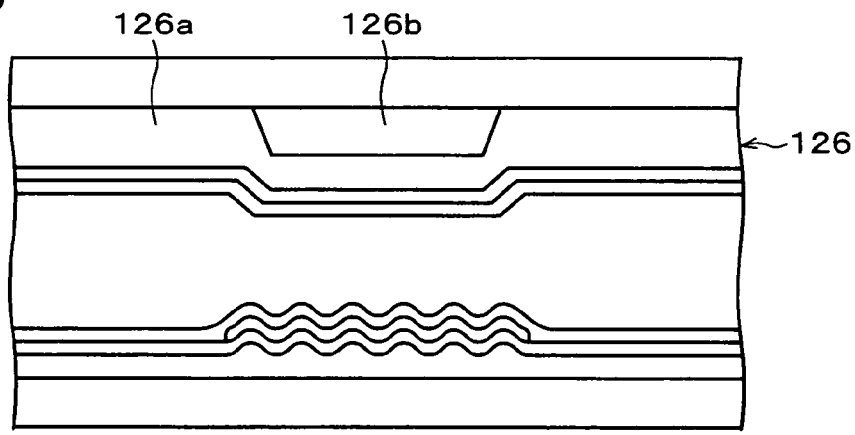
FIG. 6 is a cross-sectional view illustrating another modification example of the reflective tranmissive liquid crystal display panel of the present invention.

In the color filter, in order to adjust the optical density in the reflective region, the colored layer may be designed to have different thicknesses in the reflective region and the transmissive region as shown in FIG. 6, instead of forming the aperture in the colored layer as described above. Specifically, in a color filter 126 of the opposing substrate 12 shown in FIG. 6, a transparent layer 126b is formed corresponding to the reflective region, so that the thickness of a colored layer 126a formed on the transparent layer 126b becomes thinner in the reflective region. The exemplary structure illustrated in FIG. 6 is the same as the structure illustrated in FIG. 1 except that the color filter 126 is used instead of the color filter 122. In the structure of FIG. 6, the transparent layer 126b also serves a diffuser processed layer.

In this example, when the thickness of the colored layer 126a in the reflective region is about half of the thickness of the colored layer 126a in the transmissive region, substantially the same absorptivity can be obtained for the light transmitted through the color filter 126 in the reflective region twice and the light transmitted through the color filter 126 in the transmissive region once (the same optical density can be obtained in the transmissive region and the reflective region).

In all of the color filters 122, 125, and 126, the colored layer and the transparent layer are formed such that a step difference is created between the reflective region and the transmissive region. With the step difference, the optical function (change in retardation) of the light transmitted through the liquid crystal layer 13 will not be too different between the reflective region and the transmissive region.

That is, in the transflective liquid crystal display panel described above, a desirable optical function for the transmissive region is achieved by the incident light from the backlight transmitted through the liquid crystal layer 13 once. On the other hand, a desirable optical function for the reflective region is achieved by incident ambient light on the display surface transmitted through the liquid crystal layer 13 twice.

Assume the situation where the thickness of the liquid crystal layer is the same in the transmissive region and the reflective region. In this case, the light path in the reflective region is twice as long as that in the transmissive region. Accordingly, the optical function will be different in the transmissive region and the reflective region, and as a result display quality deteriorates.

On the other hand, in the color filter described above, the formation of the transparent layer creates a step difference between the reflective region and the transmissive region. With the step difference, the thickness of the liquid crystal layer 13 becomes thinner in the reflective region than in the transmissive region. That is, the difference in length of the light path is reduced between the reflective region and the transmissive region, thereby reducing the difference in optical function between the reflective region and the transmissive region.

Further, when the thickness of the liquid crystal layer 13 in the transmissive region is set to be twice as thick as that in the reflective region, substantially the same optical function can be obtained in the reflective region and the transmissive region. This is described below with reference to the structure shown in FIG. 1 as an example. Specifically, by setting the surface step difference CFd of the color filter 122 to satisfy the following equation, the thickness of the liquid crystal layer 13 in the transmissive region can be made almost twice as thick as that in the reflective region.

$$Td = Rd + CFd(=Rd) = 2Rd,$$

where Td is the thickness of the liquid crystal layer 13 in the transmissive region, Rd is the thickness of the liquid crystal layer 13 in the reflective region, and CFd is the surface step difference of the color filter 122.

When adjusting the surface step difference CFd of the color filter alone is insufficient to set a proper thickness ratio of the liquid crystal layer 13 between the transmissive region and the reflective region, a step difference may be created between the reflective region and the transmissive region on the active matrix substrate 14 side.

Figure 7:
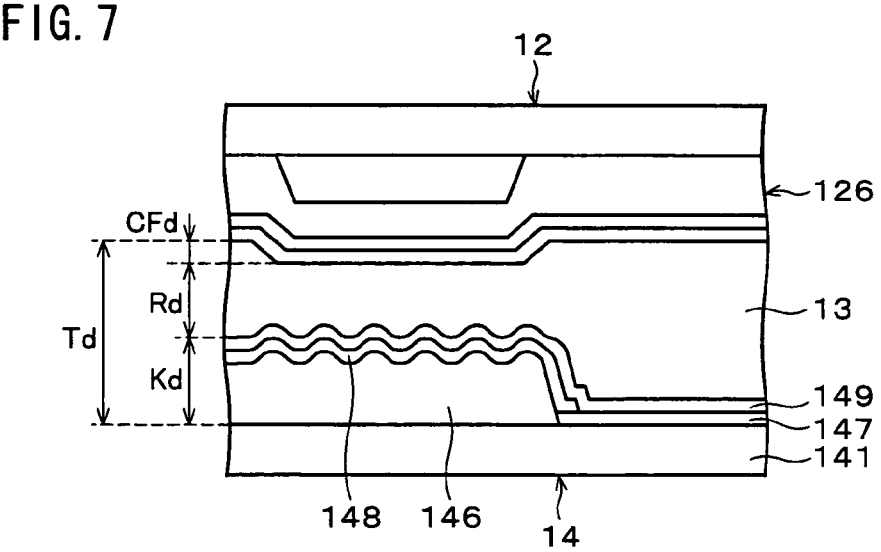
FIG. 7 is a cross-sectional view illustrating still another modification example of the reflective tranmissive liquid crystal display panel of the present invention.
Figure 8A:
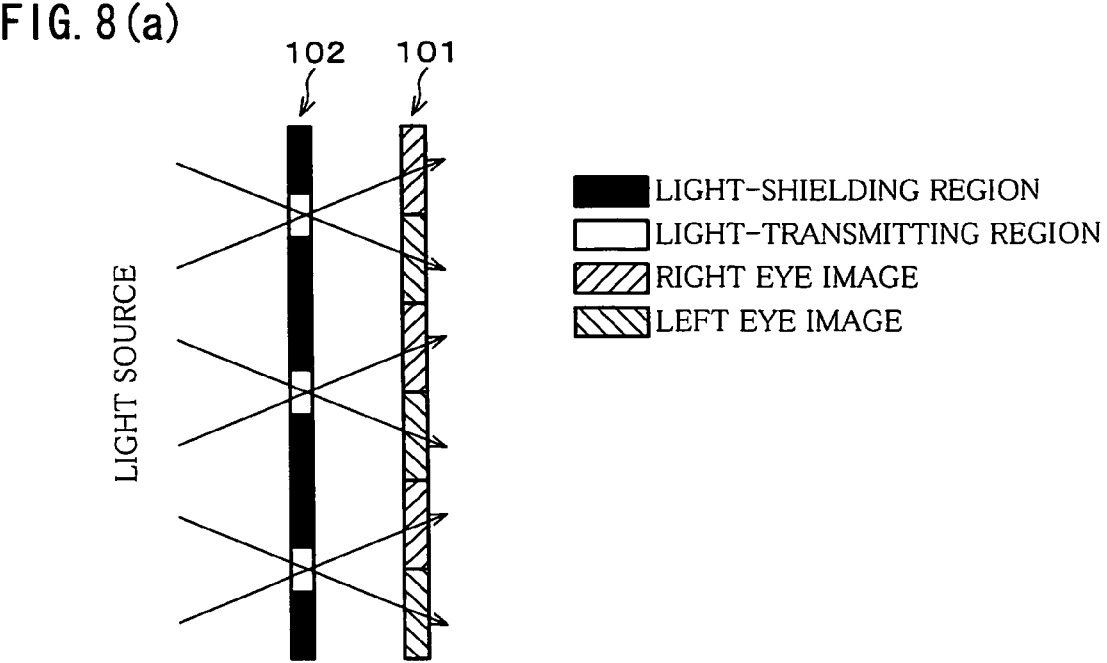
FIG. 8(a) is a diagram illustrating an effect of giving a viewing angle by a parallax barrier.
Figure 8B:
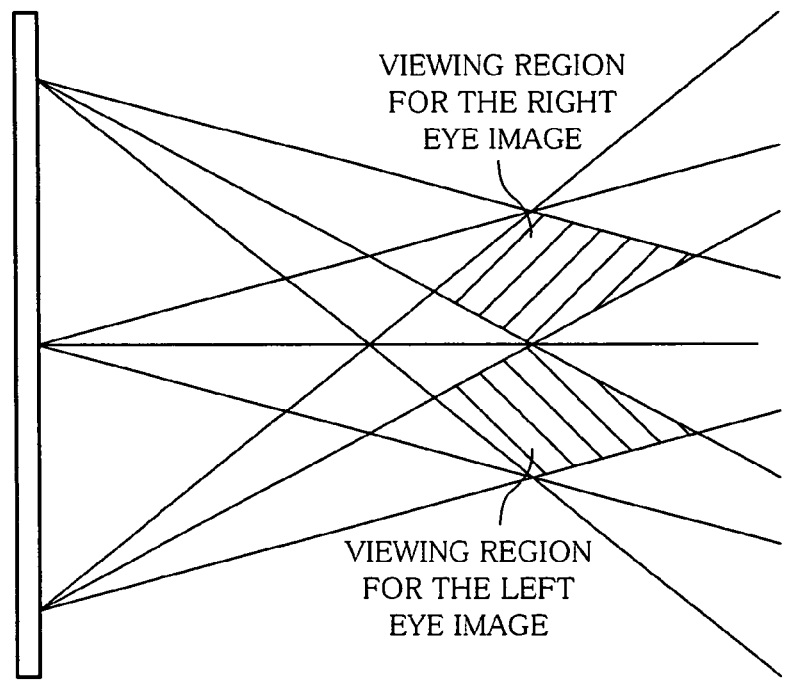
FIG. 8(b) is a diagram illustrating viewing regions for a 3D display screen.
Figure 9:
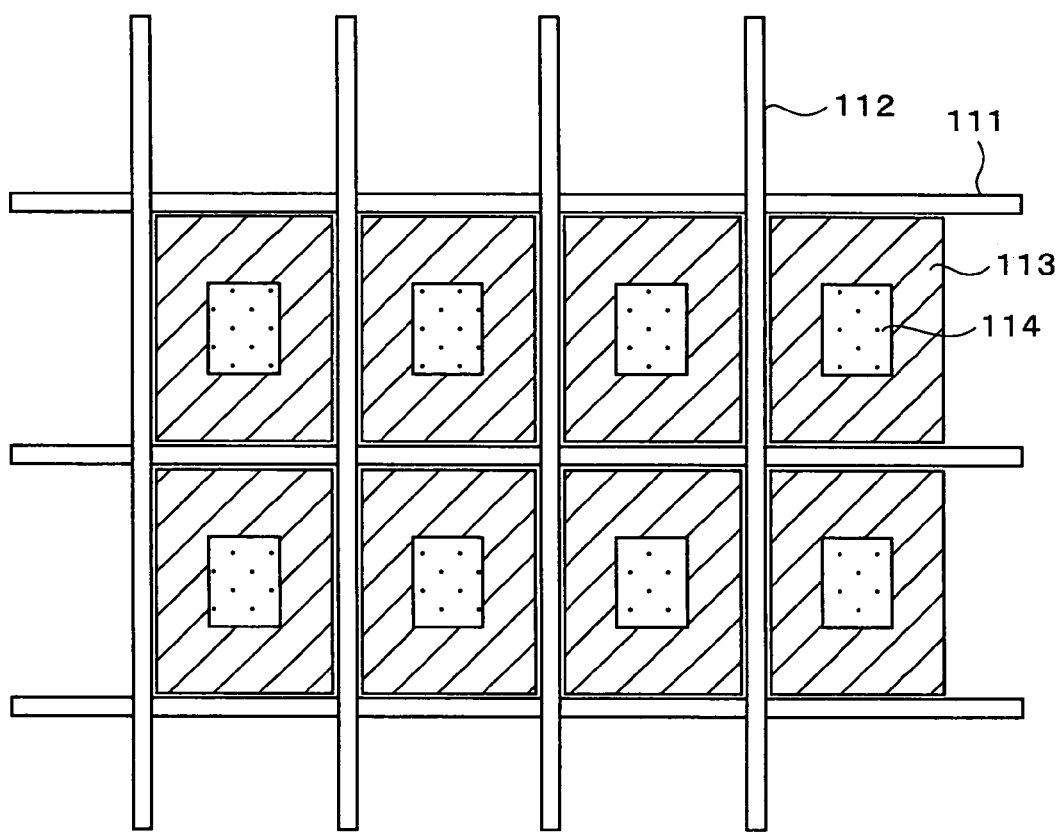
FIG. 9 is a plan view illustrating one example of a structure of an active matrix substrate used in the transflective liquid crystal display panel.

FIG. 7 shows a structure in which a step difference is created between the reflective region and the transmissive region on the active matrix substrate 14 side. In this case, the transparent insulating layer 146 formed on the transparent substrate 141 corresponds to only the reflective region. A transmissive electrode 147 is formed on the bottom of the step difference created by the transparent insulating layer 146, while a reflective electrode 148 is formed on the top of the step difference created by the transparent insulating layer 146. The transmissive electrode 147 and the reflective electrode 148 are electrically connected to each other by overlapping part of the respective edges.

In the structure shown in FIG. 7, the transparent insulating layer 146 creates a step difference (Kd) between the transmissive electrode 147 and the reflective electrode 148. By setting the surface step differences CFd and Kd to satisfy the following equation, the thickness of the liquid crystal layer 13 in the transmissive region can be made almost twice as thick as that in the reflective region.

$$Td=Rd+CFd+Kd,$$

where Td is the thickness of the liquid crystal layer 13 in the transmissive region, Rd is the thickness of the liquid crystal layer 13 in the reflective region, and CFd is the surface step difference of the color filter 122.

Note that, in the structure shown in FIG. 7, the color filter 126 illustrated in FIG. 6 is used for the opposing substrate 12. However, the color filter 122 shown in FIG. 1 or the color filter 125 shown in FIG. 5 may be used as well.

As described above, in the transflective liquid crystal display of the present embodiment, the diffuser process is performed only in a portion corresponding to the reflective region. Therefore, the light scattering effect due to the diffuser process does not occur in the transmissive region. As a result, linearity of display light is not hindered and desirable 3D display performance can be realized. Further, desirable 3D display can be obtained while at the same time preventing moire in 2D display.

Further, in the liquid display panel, a polarizer constitutes the outermost layer closest to the display surface. In order to prevent the ambient light from reflecting on the polarizer, an anti-glare (AG) or anti-reflection (AR) treatment is performed on the surface of the polarizer.

However, the AG treatment utilizes the light scattering effect to prevent reflection, and, to this end, microscopic irregularities are formed on the surface of the polarizer. Therefore, like the diffuser processing, when the AG treatment has the adverse effect on the performance of 3D display. Thus, in the 3D liquid crystal panel, the AR process is preferably used to prevent the ambient light from reflecting on the surface of the polarizer.

A transflective liquid crystal display panel of the present invention is used as the displaying liquid crystal panel 10 shown in FIG. 2, and combined with the patterned retardation plate 20 and the switching liquid crystal panel 30. In this way, a 2D/3D switching type liquid crystal display panel of the present invention is realized. In addition, by incorporating driving circuits, a backlight, or other components, the 2D/3D switching type liquid crystal display panel can realize a 2D/3D switching type liquid crystal display.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to a configuration of the present invention, linearity of display light is not hindered and desirable 3D display performance can be achieved. In addition, prevention of moire in 2D display and desirable 3D display can be realized at the same time. Therefore, the present invention can be suitably applied to a transflective liquid crystal display panel used as a displaying liquid crystal display panel in a 2D/3D switching type liquid crystal display panel capable of switching 2D display and 3D display. The invention is also suitable for a 2D/3D switching type liquid crystal display panel incorporating the transflective liquid crystal display panel, and a 2D/3D switching type liquid crystal display.

The invention claimed is:

1. A 2D/3D switching type liquid crystal display panel, comprising:
   display image generating means, capable of carrying out 2D display and 3D display, for generating a display image according to input image data;
   parallax barrier means for giving a specific viewing angle to the display image in carrying out 3D display, so as to obtain a 3D effect; and
   switching means for activating and inactivating the effect of the parallax barrier means, so as to switch 2D display and 3D display,
   said display image generating means being a transflective liquid crystal display panel including:
   a reflective region for performing reflective display; and
   a transmissive region for performing transmissive display, the reflective region and the transmissive region being provided for each pixel, and
   a diffuser processed layer provided only in a portion corresponding to the reflective region, and wherein the diffuser processed layer comprises a plurality of light scattering particles in a resin, the particles and the resin having different indices of refraction, and wherein the diffuser processed layer is located on an opposite side of the liquid crystal layer than a reflective electrode of the reflective region.

2. A 2D/3D switching type liquid crystal display, comprising a 2D/3D switching type liquid crystal display panel including:
   display image generating means, capable of carrying out 2D display and 3D display, for generating a display image according to input image data;
   parallax barrier means for giving a specific viewing angle to the display image in carrying out 3D display, so as to obtain a 3D effect; and
   switching means for activating and inactivating the effect of the parallax barrier means, so as to switch 2D display and 3D display,
   said display image generating means being a transflective liquid crystal display panel including:
   a reflective region for performing reflective display; and
   a transmissive region for performing transmissive display, the reflective region and the transmissive region being provided for each pixel, and
   a diffuser processed layer provided substantially only in a portion corresponding to the reflective region, wherein the diffuser processed layer is located on an opposite side of the liquid crystal layer than a reflective electrode of the reflective region.

3. A liquid crystal display panel, comprising:
 display image generating means for generating two display images according to input image data;
 parallax barrier means for separating the two display images into different viewing angles; and
 switching means for activating and inactivating the effect of the parallax barrier means,
 said display image generating means being a transflective liquid crystal display panel including:
 a reflective region for performing reflective display; and
 a transmissive region for performing transmissive display,
 the reflective region and the transmissive region being provided for each pixel, and
 a diffuser processed layer provided substantially only in a portion corresponding to the reflective region, and wherein the diffuser processed layer comprises a plurality of light scattering particles in a resin, the particles and the resin having different indices of refraction and wherein the diffuser processed layer is located on an opposite side of the liquid crystal layer than a reflective electrode of the reflective region.

4. A liquid crystal display, comprising a liquid crystal display panel including:
 display image generating means for generating two display images according to input image data;
 parallax barrier means for separating the two display images into different viewing angles; and
 switching means for activating and inactivating the effect of the parallax barrier means,
 said display image generating means being a transflective liquid crystal display panel including:
 a reflective region for performing reflective display; and
 a transmissive region for performing transmissive display,
 the reflective region and the transmissive region being provided for each pixel, and
 a diffuser processed layer provided substantially only in a portion corresponding to the reflective region, wherein the diffuser processed layer is located on an opposite side of the liquid crystal layer than a reflective electrode of the reflective region.

5. The panel of claim 1, wherein the diffuser processed layer is subjected to a diffuser process which makes resin light scattering by inclusion of the particles in the resin of the diffuser processed layer.

6. The panel of claim 2, wherein the diffuser processed layer is subjected to a diffuser process which makes resin light scattering by inclusion of particles in a resin of the diffuser processed layer, the particles having a different refractive index from a refractive index of the resin.

7. The panel of claim 3, wherein the diffuser processed layer is subjected to a diffuser process which makes resin light scattering by inclusion of the particles in resin of the diffuser processed layer.

8. The panel of claim 4, wherein the diffuser processed layer is subjected to a diffuser process which makes resin light scattering by inclusion of particles in a resin of the diffuser processed layer, the particles having a different refractive index from a refractive index of the resin.

9. The panel of claim 1, wherein a transparent layer, disposed opposite a reflective electrode with a liquid crystal layer in between, is subjected to a diffuser process so as to form the diffuser processed layer.

10. The panel of claim 2, wherein a transparent layer, disposed opposite the reflective electrode with a liquid crystal layer in between, is subjected to a diffuser process so as to form the diffuser processed layer.

11. The panel of claim 3, wherein a transparent layer, disposed opposite a reflective electrode with a liquid crystal layer in between, is subjected to a diffuser process so as to form the diffuser processed layer.

12. The panel of claim 4, wherein a transparent layer, disposed opposite the reflective electrode with a liquid crystal layer in between, is subjected to a diffuser process so as to form the diffuser processed layer.

* * * * *